United States Patent [19]
Childers

[11] Patent Number: 5,631,738
[45] Date of Patent: May 20, 1997

[54] LASER RANGING SYSTEM HAVING REDUCED SENSITIVITY TO SURFACE DEFECTS

[75] Inventor: Edwin M. C. Childers, San Diego, Calif.

[73] Assignee: Hewlett-Packard Co., Palo Alto, Calif.

[21] Appl. No.: 521,561

[22] Filed: Aug. 30, 1995

[51] Int. Cl.$^6$ .................................................. G01B 11/14
[52] U.S. Cl. ........................... 356/375; 250/559.38
[58] Field of Search ................................... 356/375, 376; 250/559.29, 559.31, 559.38

[56] References Cited

U.S. PATENT DOCUMENTS 5,081,635  1/1992  Wakabayashi et al. .................... 372/57

FOREIGN PATENT DOCUMENTS 63-200011  8/1988  Japan ....................... 356/375

Primary Examiner—F. L. Evans

[57] ABSTRACT

An improved apparatus and method for measuring the distance between a known point and a point of the surface of a component having an imperfection therein. The apparatus includes an optical range finding system having a light source that generates a collimated beam of light for illuminating the point on the surface of the component and a detector for receiving light reflected from the point on the surface. The detector generates a signal indicative of the distance between the known point and the point of illumination. The present invention utilizes an actuator for moving the component in a plane perpendicular to a line from the known point to the point on the surface such that the collimated beam scans an area larger than the imperfection. The output of the detector is averaged over the scanned area to provide a distance measurement that is less sensitive to the imperfection.

4 Claims, 3 Drawing Sheets

LASER RANGING SYSTEM HAVING REDUCED SENSITIVITY TO SURFACE DEFECTS

FIELD OF THE INVENTION

The present invention relates to systems for measuring the distance between a known point and the surface of an object, and more particularly, to laser range finding systems.

BACKGROUND OF THE INVENTION

There are numerous applications in which the distance from an instrument to a surface must be measured to a high precision. For example, U.S. Pat. No. 4,926,452 to Baker, et al. discloses a system in which an x-ray based imaging system having a very shallow depth of field is used to examine solid objects such as printed circuit cards. The shallow depth of field provides a means for examining the integrity of a solder joint without interference from the components above and below the solder joint. The material above and below the solder joint is out of focus, and hence, contributes a more or less uniform background.

To provide the needed selectivity, the depth of field of the imaging system must be less than 2 mils. Unfortunately, the surface variations on the printed circuit card exceed this tolerance. To overcome this drawback, the surface of the printed circuit card is mapped using a laser range finder. The detailed map is used to position the circuit card with respect to x-ray imaging system such that the component of interest is in focus even when the card is translated from one field of interest to another.

Prior art laser ranging systems can provide the required topological map of the surface provided the surface is free of imperfections that have dimensions of the order of those of the diameter of the laser beam. Two types of ranging systems are commercially available. Both types operate by illuminating the point on the surface with a collimated beam of light from a laser. In the first type of system, the laser beam strikes the surface at right angles to the surface and illuminates a small spot on the surface. The illuminated spot is imaged onto an array of detectors by a lens. The distance from the laser to the surface determines the degree to which the illuminated spot is displaced from the axis of the lens. As a result, as the distance changes, the image of the spot moves along the array of detectors. The identity of the detector on which the projected spot falls provides the information needed to determine the distance to the point on the surface. In this type of system, an imperfection that is larger than the laser beam at the point of measurement will result in an error that can be as large as the height of the imperfection.

In more sophisticated versions of this type of system, the image of the spot falls on more than one detector. The detection circuitry computes the center of the image to provide a more precise distance determination. Here, imperfections in the surface that distort the image on the detector array will also cause errors even though the height of the imperfections is insufficient to cause an significant distance error.

The second type of system assumes that the surface is flat and reflective. In this type of system, the laser beam is directed at the surface at an oblique angle and reflected from the surface onto the detector array without an imaging lens. The distance is then measured by identifying the detector receiving the reflected light beam. The distance measurement relies on a knowledge of the angle of incidence of the angle of incidence of the laser beam with respect to the surface. If the surface includes an imperfection which has dimensions similar to that of the laser beam, this assumption will not be satisfied, since the surface of the imperfection will determine the angle of incidence. The resulting errors can be much larger than the height of the imperfection in this type of system.

In principle, the problems introduced by such imperfection could be mitigated by increasing the diameter of the laser beam. Unfortunately, the diameter of the laser beam must be kept to a minimum to provide the required accuracy in the range measurement.

Broadly, it is the object of the present invention to provide an improved laser range finding system.

It is a further object of the present invention to provide a laser range finding system that is less sensitive to imperfections in the surface being ranged than prior art laser range finding systems without expanding the laser beam.

These and other objects of the present invention will become apparent to those skilled in the art from the following detailed description of the invention and the accompanying drawings.

SUMMARY OF THE INVENTION

The present invention is an improved apparatus and method for measuring the distance between a known point and a point of the surface of a component having an imperfection therein. The apparatus includes an optical range finding system having a light source that generates a collimated beam of light for illuminating the point on the surface of the component and a detector for receiving light reflected from the point on the surface. The detector generates a signal indicative of the distance between the known point and the point of illumination. The present invention utilizes an actuator for moving the component in a plane perpendicular to a line from the known point to the point on the surface such that the collimated beam scans an area larger than the imperfection. The output of the detector is averaged over the scanned area to provide a distance measurement that is less sensitive to the imperfection.

DETAILED DESCRIPTION OF THE INVENTION

Figure 1:
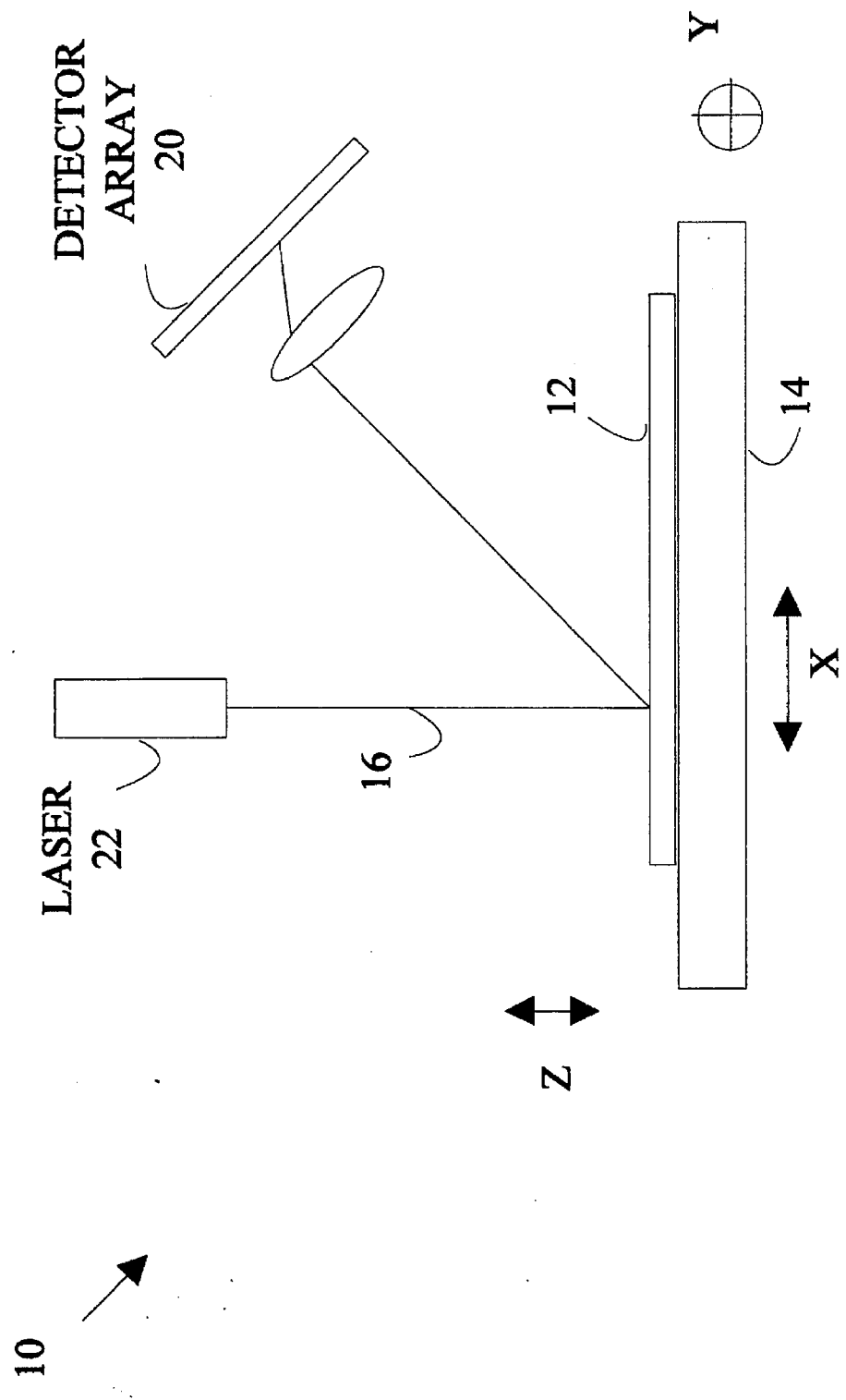
FIG. 1 is a cross-sectional view of a laser range finding system according to the present invention.

The present invention may be more easily understood with reference to FIG. 1 which is a cross-sectional view of a laser ranging system 10 according to the preferred embodiment of the present invention. The component 12 to be measured is placed on an x-y table 14 which can be moved in a plane perpendicular to the axis of the laser beam 16 as indicated by the arrows marked X and Y. The y-direction is perpendicular to the drawing. Carriages and actuators for implementing x-y tables are well known in the mechanical arts, and hence, will not be discussed in detail here.

The light reflected from the surface is imaged onto an array of detectors 20 by lens 21. The detector array is positioned in a known relationship with respect to laser 22. The interception point on array 20 at which the image of the spot on the surface of the object is projected is used to determine the distance, Z, from the laser to the surface of the component. Laser ranging systems of this type are well known to the art, and hence, will not be discussed in detail here. In addition, laser systems with sufficient accuracy may be purchased from vendors such as Keyence Corp. of New Jersey.

Figure 2:
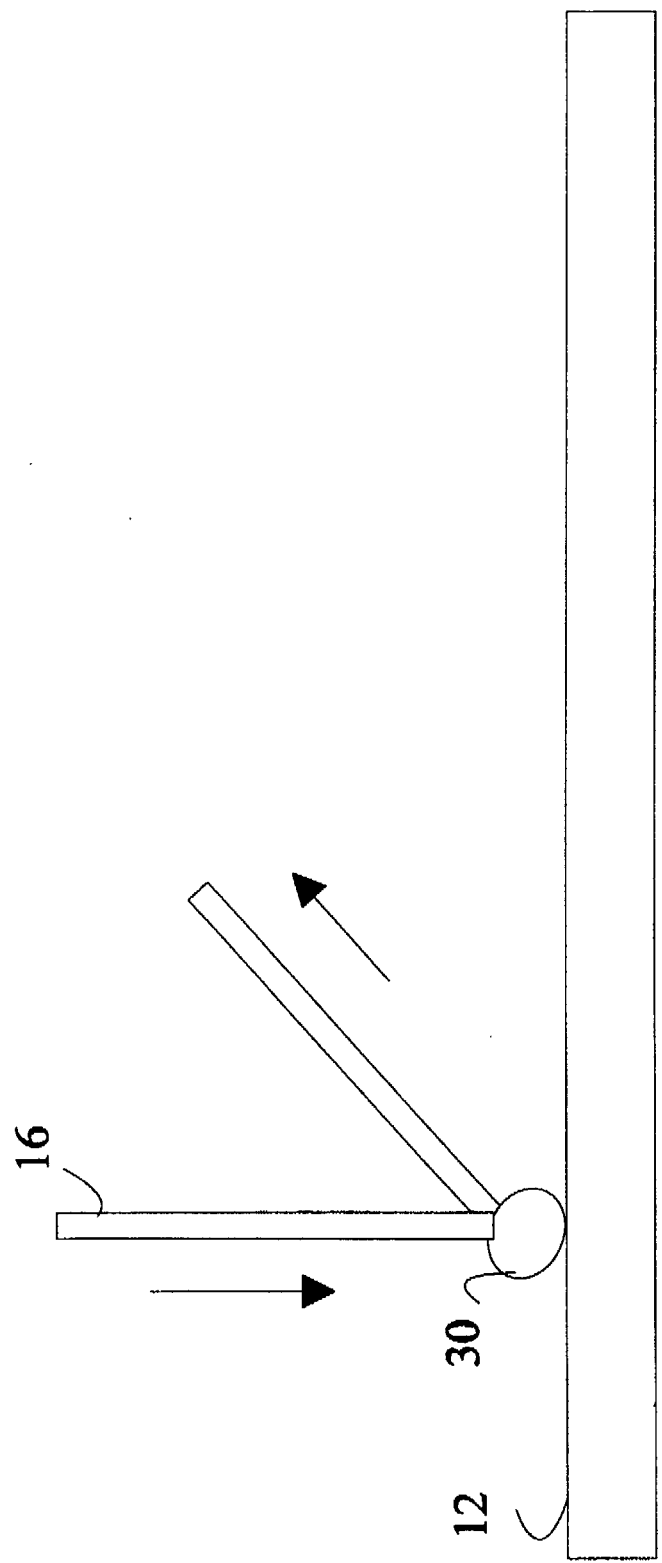
FIG. 2 is an enlarged view of the laser beam and component surface shown in FIG. 1.

As noted above, the surface of component 12 may include an imperfection which is large compared to the diameter of the laser beam but small compared to the region of interest on the surface. Such an imperfection is shown in detail in FIG. 2 at 30 which is an enlarged cross-sectional view of the laser beam and the surface imperfection. In systems that image the laser spot back onto the detectors to determine the distance Z, an imperfection such as that shown at 30 will cause the imaging system to compute a distance which is reduced by the height of the imperfection.

The present invention overcomes the errors introduced by the imperfection by moving the component such that the laser beam scans an area that is larger than the imperfection but smaller than the smallest area over which the surface of the component is expected to vary significantly. The output of the detector is averaged over this scan area. The scan is preferably carried out in both the X and Y directions; however, improvements may still be obtained if the scan is carried out only in one direction. The scanning motion effectively averages out small imperfections without changing the laser beam diameter. Hence, high precision can be maintained without small imperfections introducing errors.

The maximum allowable scan area can be determined from a knowledge of the maximum variability of the surface of the component and the precision with which the surface topology is to be mapped. The maximum area is approximately the area over which the average height varies by more than the allowed error in the surface height mapping.

The minimum scan area is the area of the smallest imperfection that must be averaged. However, the preferred embodiment of the present invention uses an area several times this to gain the maximum averaging, provided the area is not greater than the maximum area discussed above.

It should be noted that the method of the present invention also reduces the errors caused by nearby objects that have a much higher reflectivity than the surface being measured. Consider the measurement of a printed circuit board having components mounted thereon. The leads of the components are often much more reflective than the surrounding surface of the circuit board. Stray light from the laser striking a nearby highly reflective area can introduce a signal into the detector array that is confused with the image of the laser on the less reflective circuit board surface. The scanning motion described above has been found to reduce these artifacts as well.

While the above described embodiments of the present invention have utilized a detector array such as a one-dimensional CCD detector array, it will be apparent to those skilled in the art that other detectors may be utilized. In one embodiment of the present invention, the detector array is a two-dimensional camera. The additional information obtained from analyzing the shape of the image at the camera allows even more accurate height measurements.

Detectors based on one-dimensional diode structures that provide an output indicative of the position of a light spot along a line will also be apparent to those skilled in the art. Such detectors are utilized in a number of commercially available laser ranging systems.

The above embodiments of the present invention have been discussed in terms of moving the component being measured. However, it will be apparent to those skilled in the art that embodiments in which the component remains fixed and the laser ranging system is moved will also provide the advantages described above.

While the above embodiments of the present invention have been described in terms of a laser as the light source, it will be apparent to those skilled in the art that any collimated light source may be used provided the spot is sufficiently small to provide the required ranging accuracy.

Figure 3:
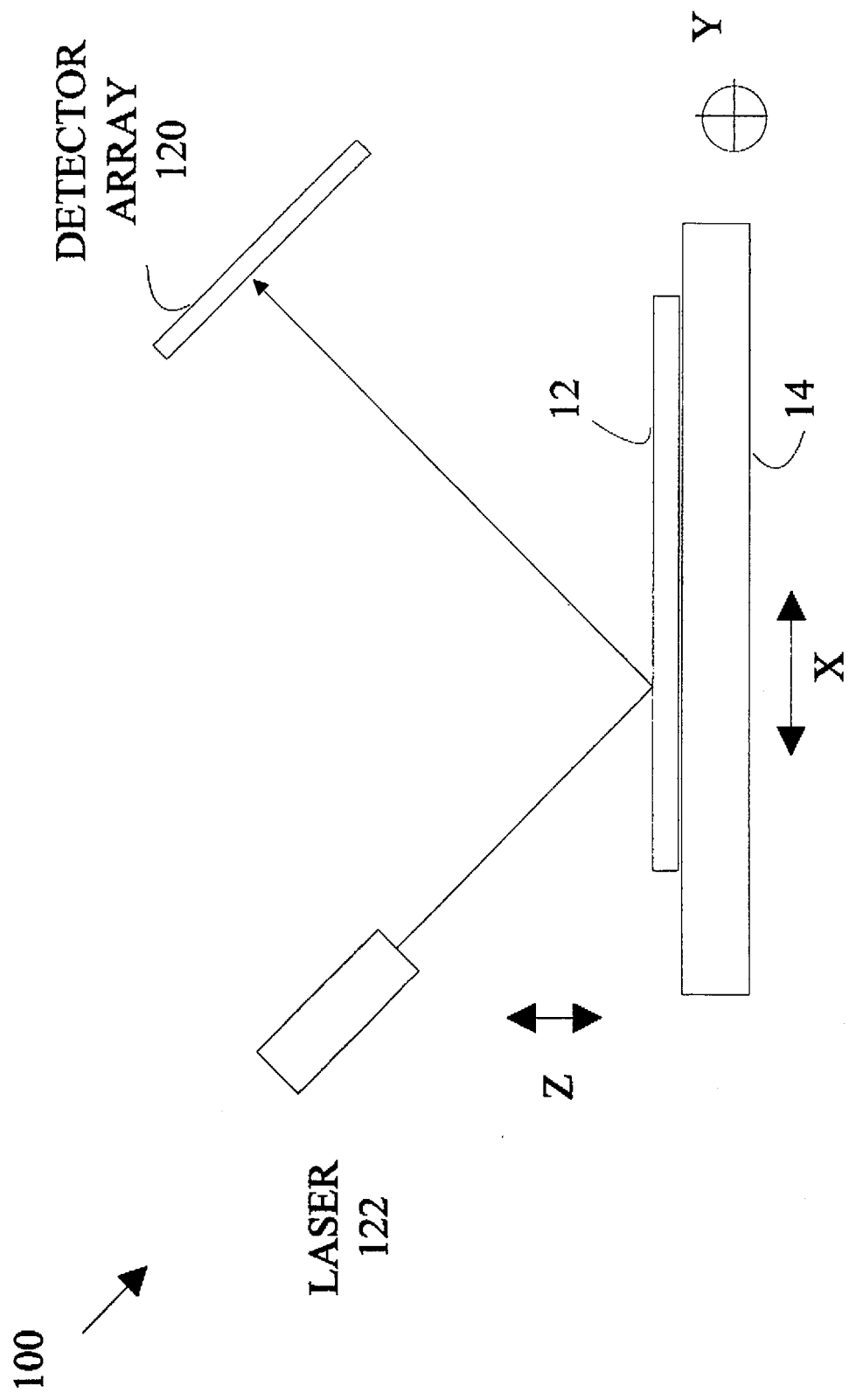
FIG. 3 is a cross-sectional view of an embodiment of the present invention in which the laser range finding operates by reflecting the laser beam off of the surface and onto the detector array.

In embodiments in which the laser range finding operates by reflecting the laser beam off of the surface and onto the detector array, the incident laser beam is not at normal incidence to the surface. Such an arrangement is shown in FIG. 3 at 100. Laser 122 illuminates the surface of the component with a beam that is reflected off of the surface onto detector array 120. In these embodiments, the component is moved in a plane that is perpendicular to the direction of measurement, i.e., a plane in which all points are at the same Z value. Hence, the present invention may be applied to both types of laser ranging system. In each case, the component is moved in a plane that is parallel to the component surface in the region being measured.

Various modifications to the present invention will become apparent to those skilled in the art from the foregoing description and accompanying drawings. Accordingly, the present invention is to be limited solely by the scope of the following claims.

What is claimed is:

1. An apparatus for measuring the distance between a known point and a measurement point on a surface of a component having an imperfection therein, said apparatus comprising:

a light source positioned at a predetermined location with respect to said known point, said light source illuminating said surface of said component with a collimated beam of light;

a detector for receiving light reflected from said surface of said component, said detector generating a signal indicative of said distance between said known point and said surface of said component;

means for moving said component relative to said light source in a plane parallel to the surface of said component in a region containing said measurement point, said motion having an amplitude sufficient to cause said collimated beam to scan an area larger than that occupied by said imperfection; and means for averaging said signal generated by said detector over said scan area.

2. The apparatus of claim 1 wherein said light source is a laser.

3. The apparatus of claim 1 wherein said detector comprises a plurality of photodetectors and a lens for imaging light reflected from said surface of said component onto said detector such that one of said photodetectors is illuminated, wherein said generated signal comprises information specifying the identity of said illuminated photodetector.

4. In a method for operating an optical range finding system for determining the distance between a known point and a measurement point on a surface of a component having an imperfection in the surface, said range finding system comprising a light source that generates a collimated beam of light that illuminates said measurement point of said surface and a detector for receiving light reflected from said point and generating a signal indicative of the distance between said known point and said point on said surface, the improvement comprising the steps of:

moving said light source relative to said component in a plane parallel to the surface of said component in a region containing said measurement point such that said collimated beam scans an area larger than that occupied by said imperfection; and averaging said generated signal over said area.

* * * * *